US012630215B2

(12) United States Patent
Kaltenbach et al.

(10) Patent No.: US 12,630,215 B2
(45) Date of Patent: May 19, 2026

(54) ELECTROHYDRAULIC POWER STEERING DEVICE FOR A VEHICLE

(71) Applicant: KNORR-BREMSE Systeme fuer Nutzfahrzeuge GmbH, Munich (DE)

(72) Inventors: Christian Kaltenbach, Stuttgart (DE); Rainer Lang, Schwaebisch Gmuend (DE); Klaus Peterreins, Filderstadt (DE); Benjamin Bartole, Stuttgart (DE); Jonas Rink, Stuttgart (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 400 days.

(21) Appl. No.: 18/277,601

(22) PCT Filed: Feb. 4, 2022

(86) PCT No.: PCT/EP2022/052757
§ 371 (c)(1),
(2) Date: Aug. 17, 2023

(87) PCT Pub. No.: WO2022/175120
PCT Pub. Date: Aug. 25, 2022

(65) Prior Publication Data
US 2024/0124053 A1 Apr. 18, 2024

(30) Foreign Application Priority Data
Feb. 18, 2021 (DE) ..................... 10 2021 103 811.1

(51) Int. Cl.
B62D 5/06 (2006.01)
(52) U.S. Cl.
CPC .................................... B62D 5/064 (2013.01)
(58) Field of Classification Search
CPC ................................ B62D 5/065; B62D 5/064
See application file for complete search history.

(56) References Cited

U.S. PATENT DOCUMENTS 5,360,322 A 11/1994 Henein et al.
5,786,674 A * 7/1998 Kress ..................... B62D 5/065
180/428

(Continued)

FOREIGN PATENT DOCUMENTS

CN 102145711 A 8/2011
CN 207089410 U 3/2018

(Continued)

OTHER PUBLICATIONS

International Search Report (PCT/ISA/210) issued in PCT Application No. PCT/EP2022/052757 dated May 13, 2022 with English translation (4 pages).

(Continued)

*Primary Examiner* — Valentin Neacsu
*Assistant Examiner* — Hosam Shabara
(74) *Attorney, Agent, or Firm* — Crowell & Moring LLP

(57) ABSTRACT

An electrohydraulic power steering device for a vehicle includes a hydraulic pump, a drive, a first working line, a second working line, and a heat exchanger. The hydraulic pump is designed, in a first rotation direction, to pump a hydraulic oil to a first pump output of the hydraulic pump and, in a second rotation direction, to pump said oil to a second pump output of the hydraulic pump. The drive is coupled to the hydraulic pump and is designed to drive the hydraulic pump selectively in the first rotation direction or second rotation direction. The first working line is shaped to connect the first pump output fluidically to a first working chamber, the first working chamber being suitable for moving a piston, which is couplable to a steering bar of a steering system, in a first direction. The heat exchanger is designed to transfer heat that is generated during operation of the drive to at least one of the working lines in order to heat the hydraulic oil flowing through the working line.

8 Claims, 1 Drawing Sheet

(56) References Cited

U.S. PATENT DOCUMENTS

| | | | | |
|---|---|---|---|---|
| 6,233,930 | B1 * | 5/2001 | Matsuoka | H02K 11/33 417/366 |
| 7,845,458 | B2 * | 12/2010 | Vigholm | B62D 12/00 180/417 |
| 8,058,824 | B2 * | 11/2011 | Williams | H02P 21/18 318/265 |
| 2006/0075751 | A1 * | 4/2006 | Bender | B62D 5/064 60/456 |
| 2011/0190986 | A1 * | 8/2011 | Bitou | B62D 5/064 701/41 |
| 2019/0219069 | A1 | 7/2019 | Yang et al. | |
| 2022/0153341 | A1 | 5/2022 | Lang et al. | |
| 2024/0300573 | A1 * | 9/2024 | Miller | B62D 5/064 |

FOREIGN PATENT DOCUMENTS

| | | | | | |
|---|---|---|---|---|---|
| DE | 103 07 566 | A1 | | 9/2004 | |
| DE | 10 2005 043 802 | A1 | | 3/2007 | |
| DE | 10 2007 053 263 | A1 | | 5/2009 | |
| DE | 10 2011 050 164 | A1 | | 11/2012 | |
| DE | 20 2019 101 522 | U1 | | 5/2019 | |
| GB | 2 398 839 | A | | 9/2004 | |
| GB | 2530396 | A | * | 3/2016 | B62D 5/07 |
| JP | 2005198393 | A | * | 7/2005 | |
| JP | 2005-319932 | A | | 11/2005 | |
| JP | 2008-213669 | A | | 9/2008 | |
| JP | 2008-273361 | A | | 11/2008 | |
| JP | 2011-178381 | A | | 9/2011 | |
| JP | 2012-61950 | A | | 3/2012 | |
| WO | WO 2013/008051 | A1 | | 1/2013 | |

OTHER PUBLICATIONS

German-language Written Opinion (PCT/ISA/237) issued in PCT Application No. PCT/EP2022/052757 dated May 13, 2022 with English translation (9 pages).

German-language Office Action issued in German Application No. 10 2021 103 811.1 dated Nov. 26, 2021 (7 pages).

Cover Page of EP 2 731 851 A1 published May 21, 2014 (1 page).

International Preliminary Report on Patentability (PCT/IB/326 & PCT/IB/373) issued in PCT Application No. PCT/EP2022/052757 dated Aug. 31, 2023, including English translation of document C2 (German-language Written Opinion (PCT/ISA/237), filed on Aug. 17, 2023) (9 pages).

Japanese-language Office Action issued in Japanese Application No. 2023-549918 dated May 14, 2024 with English translation (8 pages).

Chinese-language Office Action issued in Chinese Application No. 202280015915.2 dated Nov. 5, 2025 with English translation (14 pages).

* cited by examiner 105  120  135  110  182  140  125

180

130

185

160  175  165  155

115

100

150  145  190  170

105

205

155

200

ELECTROHYDRAULIC POWER STEERING DEVICE FOR A VEHICLE

BACKGROUND AND SUMMARY

The present disclosure relates to an electrohydraulic power steering device for a vehicle.

Hydraulic power steering (HPS) devices for heavy utility vehicles have a block steering arrangement, pipework, a pump for hydraulic oil, and an expansion tank for hydraulic oil. Here, the hydraulic pump is permanently driven by the internal combustion engine. Since the hydraulic oil is constantly circulated, it is always at an adequate temperature, and the block steering arrangement is thus permanently thoroughly heated.

Against this background, it is the object of the present approach to create an improved electrohydraulic power steering device for a vehicle.

This object is achieved by an electrohydraulic power steering device having the features of the independent claims.

The advantages that can be achieved with the proposed approach consist in that an electrohydraulic power steering device is created, the function of which is decoupled from an internal combustion engine or electric motor of a vehicle, wherein the hydraulic oil of the power steering device is nevertheless heated.

An electrohydraulic power steering device for a vehicle has a hydraulic pump, a drive, a first working line, a second working line and a heat exchanger unit. The hydraulic pump is configured to, in a first direction of rotation, pump a hydraulic oil to a first pump outlet of the hydraulic pump and, in a second direction of rotation, pump a hydraulic oil to a second pump outlet of the hydraulic pump. The drive is coupled to the hydraulic pump and is configured to drive the hydraulic pump selectively in the first direction of rotation or the second direction of rotation. The first working line is designed to fluidically connect the first pump outlet to a first working chamber, wherein the first working chamber is suitable for moving a piston, which is couplable to a steering rod of a steering arrangement, in a first direction. The second working line is designed to fluidically connect the second pump outlet to a second working chamber, wherein the second working chamber is suitable for moving the piston, which is couplable to the steering rod of the steering arrangement, in a second direction that is opposite to the first direction. The heat exchanger unit is configured to transfer heat, which is generated during the operation of the drive, to at least one of the working lines in order to heat the hydraulic oil flowing through the working line.

This electrohydraulic power steering device can be used for a vehicle steering arrangement in utility vehicles, for example with an axle load of up to eight tonnes. The power steering device is equipped with a so-called "EPS" (Electronic Power Steering) device that is based on an electrohydraulic principle. Such an EPS arrangement is characterized by discontinuous operating behavior, that is to say the hydraulic oil in the hydraulic circuit of the steering arrangement is conveyed by a pump unit only during steering movements, that is to say in accordance with the "power on demand" principle. In the absence of a steering movement, the hydraulic oil remains at rest, as does the motor-pump unit composed of hydraulic pump and drive. This type of power steering device can be used to function as a "power on demand" steering system, for example in electrified utility vehicles without an internal combustion engine, or to independently implement automated driving requests without driver intervention, for example by means of driver assistance systems such as DAS/ADAS (levels 1-2) and HAD (levels 3-5). Owing to the fact that oil is conveyed discontinuously, and the hydraulic oil thus cools down, it is necessary for the hydraulic oil to be preheated. The electrohydraulic power steering device proposed here is therefore advantageously capable, owing to the heat exchanger unit, of utilizing waste heat that is generated by the drive to heat the hydraulic oil.

The heat exchanger unit may have a heating device for heating the hydraulic oil flowing through the at least one working line. This makes it possible for the hydraulic oil to be actively heated. The heating device may be placed in direct contact with the working line in order to heat the latter, or may project into an interior of the working line in order to directly heat the hydraulic oil itself.

The hydraulic pump may be designed as a bidirectional hydraulic pump. Pumping/suction of the hydraulic oil in two directions is thus made possible depending on the power steering action required.

In one embodiment, the power steering device may also have the steering arrangement with the steering rod, the piston, the first working chamber and the second working chamber. The steering arrangement may be a block steering arrangement. A complete steering system is thus created. The block steering arrangement may furthermore be couplable to a steering wheel.

The first working chamber and the second working chamber may be fluidically connected or connectable to one another by means of a switchable valve, for example a solenoid valve. A complete hydraulic oil circuit can thus be created which, even with only one heat exchanger unit, allows heating throughout the circuit.

The first working line may be arranged so as to run around the drive at at least one drive side of the drive, and additionally or alternatively the second working line may be arranged so as to run around the drive at a drive side which is situated opposite that drive side. An ideal transfer of heat from the drive to the closely situated working line(s) is thus ensured. The drive may comprise a radial flux machine.

It is furthermore advantageous if the power steering device, in one embodiment, has a motor housing in which the drive and additionally or alternatively the hydraulic pump is accommodated. The motor housing may ideally have a thermally conductive material. This promotes heat transfer via the material to the at least one working line.

The heat exchanger unit may be arranged outside the motor housing. In this case, it is not necessary for the heat exchanger unit to be accommodated in the motor housing. Alternatively, the heat exchanger unit is integrated in the motor housing. A compact structural form and a high degree of heat transfer can thus be achieved.

Exemplary embodiments of the approach proposed here will be discussed in more detail in the following description with reference to the figures.

Figures 1, 2:
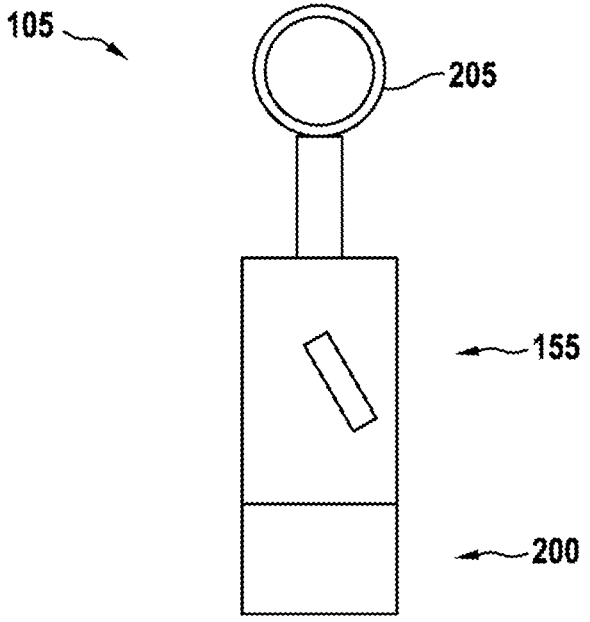
FIG. 1 is a schematic illustration of a vehicle having an electrohydraulic power steering device according to an exemplary embodiment.
FIG. 2 is a perspective illustration of an electrohydraulic power steering device according to an exemplary embodiment.

In the following description of expedient exemplary embodiments of the present approach, the same or similar reference designations will be used for elements of similar action illustrated in the various figures, wherein a description of these elements will not be repeated.

DETAILED DESCRIPTION OF THE DRAWINGS

FIG. 1 is a schematic illustration of a vehicle 100 having an electrohydraulic power steering device 105 according to an exemplary embodiment.

Merely by way of example, the electrohydraulic power steering device 105 in this exemplary embodiment is accommodated on or in the vehicle 100, which in this exemplary embodiment takes the form of a utility vehicle, for example with an axle load of up to eight tonnes. In one embodiment, the vehicle 100 is an electrified vehicle 100 or is a vehicle 100 capable of highly automated driving.

The electrohydraulic power steering device 105 has a hydraulic pump 110, a drive 115, a first working line 120, a second working line 125 and a heat exchanger unit 130. The hydraulic pump 110 is configured to, in a first direction of rotation, pump a hydraulic oil to a first pump outlet 135 of the hydraulic pump 110 and, in a second direction of rotation, pump a hydraulic oil to a second pump outlet 140 of the hydraulic pump 110. The hydraulic pump 110 is thus a pump with a variable volume flow rate. The drive 115 is coupled to the hydraulic pump 110 and is configured to drive the hydraulic pump 110 selectively in the first direction of rotation or the second direction of rotation. The first working line 120 is designed to fluidically connect the first pump outlet 135 to a first working chamber 145, wherein the first working chamber 145 is suitable for moving a piston 160, which is couplable to a steering rod 150 of a steering arrangement 155, in a first direction 165. The second working line 125 is designed to fluidically connect the second pump outlet 140 to a second working chamber 170, wherein the second working chamber 170 is suitable for moving the piston 160, which is couplable to the steering rod 150 of the steering arrangement 155, in a second direction 175 that is opposite to the first direction 165. The heat exchanger unit 130 is configured to transfer heat 180, which is generated during the operation of the drive 115, to at least one of the working lines 120, 125 in order to heat the hydraulic oil flowing through the working line 120, 125.

In this exemplary embodiment, the power steering device 105 furthermore also comprises the steering arrangement 155 with the steering rod 150, the piston 160, the first working chamber 145 and the second working chamber 170 and/or a motor housing 182. In this exemplary embodiment, the steering arrangement 155 is a block steering arrangement. In this exemplary embodiment, the drive 115 and/or the hydraulic pump 110 are accommodated in the motor housing 182. In this exemplary embodiment, the motor housing 182 has a thermally conductive material. In one exemplary embodiment, the heat exchanger unit 130 is arranged outside the motor housing 182. Alternatively, the heat exchanger unit 130 is arranged within the motor housing 182, for example is integrated into the motor housing 182. In this exemplary embodiment, the heat exchanger unit 130 optionally has a heating device 185 for heating the hydraulic oil flowing through the at least one working line 120, 125. In this exemplary embodiment, the heating device 185 is placed in contact in or on the first working line 120 or around the first working line 120. In this exemplary embodiment, the heat exchanger unit 130 is arranged at the level of the drive 115. For example, the heat exchanger unit 130 is connected to the motor housing 182 directly or via a heat bridge for conducting heat. In one exemplary embodiment, the heat exchanger unit 130 is integrated into the motor housing 182.

In this exemplary embodiment, the first working chamber 145 and the second working chamber 170 are fluidically connected or connectable to one another by means of a switchable valve 190, in this case for example a solenoid valve. In this exemplary embodiment, the first working line 120 is arranged so as to run around the drive 115 at at least one drive side of the drive 115, and/or the second working line 125 is arranged so as to run around the drive 115 at a drive side which is situated opposite that drive side. In this exemplary embodiment, the drive 115 comprises a radial flux machine.

The power steering device 105 proposed here advantageously has an internal heating unit for an electrohydraulic "Electronic Power Steering" steering gear, or "EPS steering gear" for short.

The EPS device 105 adopts a fully integral plug and play approach. Here, the hydraulic oil circuit is decoupled from a vehicle drive such as an internal combustion engine or electric motor of the vehicle 100 and is attached as a compact drive unit to the block steering system; in this regard, see also FIG. 2.

Owing to the fact that oil is conveyed discontinuously, and the hydraulic oil thus cools down in the drive unit of the EPS device, it is necessary to preheat the hydraulic oil. The preheated hydraulic oil is advantageously distributed in, and uniformly thoroughly heats, the power steering device 105 proposed here. Owing to the approach described here, the generated thermal energy is transferred directly into the hydraulic oil. This is made possible over a full volume flow and pressure range, in this exemplary embodiment over a volume flow range of 0 to 16 l/min and/or a pressure range of 0 to 180 bar. The heating of the hydraulic oil is essential for uniform system rigidity and an associated steering feel.

In the drive unit, the drive 115 of the hydraulic pump 110, which in this exemplary embodiment is a drive motor, serves as a heat source. In this exemplary embodiment, the drive motor is an electric motor, for example a radial flux machine or a radial flux motor. The waste heat of the drive 115 is utilized to heat the hydraulic oil. Owing to the fact that the working lines 120, 125, designed as hydraulic lines, are arranged spatially separately around the drive 115, the waste heat during operation is transferred directly to the hydraulic medium by heat conduction through the housing material of the drive 115.

The power steering device 105 performs the task of releasing the generated heat, in the form of waste heat of the drive 115, to the hydraulic oil that flows directly into the working chambers 145, 170 of the block steering system. Owing to the arrangement, during power steering operation, the waste heat of the motor can be utilized to heat the oil and thoroughly heat the entire power steering device 105.

Furthermore, in this exemplary embodiment, the power steering device 105 optionally has the switchable valve 190 that connects the two working chambers 145, 170 of the steering arrangement 155. Thus, in one exemplary embodiment, a heating function (when the vehicle 100 is at a standstill for a relatively long period of time, for example when parked during a work break) can be used in which the coils of the drive 115 are used as a heating element. In one exemplary embodiment, the heat generated is introduced means of the power steering device 105 described here into the hydraulic oil, and is pumped in the circuit by way of the switchable valve 190 until a particular target temperature that allows the vehicle 100 to commence driving is reached.

A simplified hydraulic circuit diagram of a bidirectional EPS device 105 is schematically illustrated here. The heat exchanger unit 130 in the form of an integrated heating unit is configured to release the waste heat to the first working line 120 for the purposes of bringing the hydraulic oil up to temperature. When the first working line 120 is operated with pressure, the hydraulic oil is transported directly into the first working chamber 145 and moves the piston 160 to the right in accordance with the power steering action designed by the driver. When the first working line 120 is operated with suction, the heat is released from the first working line 120 to the oil that is drawn in, and said heat is transferred via the second working line 125 into the second working chamber 170. In this case, the second working line 125 is operated with pressure. The approach proposed here describes a possibility for introducing the waste heat of the radial flux motor directly into the working lines 120, 125 by way of the heat exchanger unit 130. The hydraulic oil is thus heated, and the system behavior is improved owing to a lower and more uniform oil viscosity.

FIG. 2 is a perspective illustration of an electrohydraulic power steering device 105 according to an exemplary embodiment. This may be the power steering device 105 described in FIG. 1. The EPS device 105 adopts a fully integral plug and play approach. Here, the hydraulic oil circuit is decoupled from the internal combustion engine or electric motor of the vehicle 100 and is attached as a compact drive unit 200 to the steering arrangement 155 in the form of the block steering arrangement. The steering arrangement 155 is furthermore designed to be coupled to a steering wheel 205.

In one exemplary embodiment, the power steering device 105 furthermore has a control unit which is designed to output an activation signal, which is configured to activate the drive and/or the hydraulic pump, in response to a steering actuation signal which represents an actuation of the steering wheel 205, and/or to output a deactivation signal, which is configured to activate the drive and/or the hydraulic pump, in response to a steering rest signal which represents a rest state of the steering wheel 194.

LIST OF REFERENCE DESIGNATIONS

100 Vehicle
105 Electrohydraulic power steering device
110 Hydraulic pump
115 Drive
120 First working line
125 Second working line
130 Heat exchanger unit
135 First pump outlet
140 Second pump outlet
145 First working chamber
150 Steering rod
155 Steering arrangement
160 Piston
165 First direction
170 Second working chamber
175 Second direction
180 Heat
182 Motor housing
185 Heating device
190 Valve
200 Drive unit
205 Steering wheel

6

The invention claimed is:

1. An electrohydraulic power steering device for a vehicle, comprising:
   a bidirectional hydraulic pump which is configured to, in a first direction of rotation, pump a hydraulic oil to a first pump outlet of the hydraulic pump and, in a second direction of rotation, pump a hydraulic oil to a second pump outlet of the hydraulic pump;
   a drive which is coupled to the hydraulic pump and which is configured to drive the hydraulic pump selectively in the first direction of rotation or the second direction of rotation;
   a first working line which is designed to fluidically connect the first pump outlet to a first working chamber, wherein the first working chamber is suitable for moving a piston, which is couplable to a steering rod of a steering arrangement, in a first direction;
   a second working line which is designed to fluidically connect the second pump outlet to a second working chamber, wherein the second working chamber is suitable for moving the piston, which is couplable to the steering rod of the steering arrangement, in a second direction that is opposite to the first direction; and
   a heat exchanger, which is configured to transfer heat generated during operation of the drive, to at least one of the working lines in order to heat the hydraulic oil flowing through the working line;
   wherein the first working chamber and the second working chamber are fluidically connected or connectable to one another via a switchable valve; and,
   wherein the valve is arranged in a circuit comprising the first and second working lines, the first and second working chambers, and the valve to enable heating throughout the entire circuit using only the heat exchanger.

2. The power steering device as claimed in claim 1, wherein
   the heat exchanger has a heater for heating the hydraulic oil flowing through the at least one working line.

3. The power steering device as claimed in claim 1, further comprising:
   a steering arrangement with the steering rod, the piston, the first working chamber and the second working chamber.

4. The power steering device as claimed in claim 1, wherein
   the first working line is arranged so as to extend around the drive at at least a first drive side of the drive, and/or
   the second working line is arranged so as to extend around the drive at a drive side of the drive which is situated opposite the first drive side.

5. The power steering device as claimed in claim 1, further comprising:
   a motor housing in which the drive and/or the hydraulic pump is accommodated.

6. The power steering device as claimed in claim 5, wherein
   the motor housing comprises a thermally conductive material.

7. The power steering device as claimed in claim 5, wherein
   the heat exchanger is integrated in the motor housing.

8. The power steering device as claimed in claim 5, wherein
   the drive comprises a radial flux machine.

* * * * *